(12) United States Patent
Ikeda et al.

(10) Patent No.: US 9,340,034 B2
(45) Date of Patent: May 17, 2016

(54) INKJET RECORDING APPARATUS AND INKJET RECORDING METHOD

(75) Inventors: Tohru Ikeda, Yokohama (JP); Nobutaka Miyake, Yokohama (JP); Akitoshi Yamada, Yokohama (JP); Fumitaka Goto, Tokyo (JP); Tomokazu Ishikawa, Kawasaki (JP); Mitsuhiro Ono, Tokyo (JP); Hidetsugu Kagawa, Kawasaki (JP); Junichi Nakagawa, Tokyo (JP); Ryosuke Iguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/605,876

(22) Filed: Sep. 6, 2012

(65) Prior Publication Data

US 2012/0327151 A1    Dec. 27, 2012

Related U.S. Application Data

(63) Continuation of application No. 12/964,591, filed on Dec. 9, 2010, now Pat. No. 8,308,268.

(30) Foreign Application Priority Data

Nov. 10, 2010    (JP) .................................. 2010-251900

(51) Int. Cl.
*B41J 29/38* (2006.01)
*B41J 2/21* (2006.01)
*H04N 1/60* (2006.01)

(52) U.S. Cl.
CPC .............. *B41J 2/2142* (2013.01); *B41J 2/2146* (2013.01); *H04N 1/6033* (2013.01); *H04N 1/6041* (2013.01)

(58) Field of Classification Search
USPC .................................. 347/5, 9, 19, 14, 15, 13
IPC .................................................. B41J 2009/3935
See application file for complete search history.

(56) References Cited

U.S. PATENT DOCUMENTS

| 6,412,902 | B2 * | 7/2002 | Matsumoto et al. | ............ 347/19 |
| 7,950,768 | B2 * | 5/2011 | Yoshida et al. | .................. 347/19 |
| 2005/0030327 | A1 * | 2/2005 | Tatsumi | .......................... 347/13 |
| 2005/0046658 | A1 * | 3/2005 | Kojima | ............................ 347/19 |
| 2009/0244154 | A1 * | 10/2009 | Miyamoto | ...................... 347/15 |

FOREIGN PATENT DOCUMENTS

| JP | 2006-181842 A | 7/2006 |
| JP | 2009-234115 A | 10/2009 |

* cited by examiner

*Primary Examiner* — Lam Nguyen
(74) *Attorney, Agent, or Firm* — Canon U.S.A., Inc. IP Division

(57) ABSTRACT

When the width of a recording head is greater than the width of a recording medium having a maximum conveyable width, a recorded image corresponding to ejecting ports in the entire area of the recording head cannot be corrected. Multiple correction test patterns are recorded using ejecting ports in part of the recording head, and correction data for correcting an image corresponding to ejecting ports in the entire area of the recording head on the basis of the colorimetric result of the test patterns. In this way, image data to be recorded by the ejecting ports in the entire area of the recording head is corrected.

16 Claims, 14 Drawing Sheets

INKJET RECORDING APPARATUS AND INKJET RECORDING METHOD

CROSS-REFERENCE TO RELATED APPLICATIONS

This application is a continuation of application Ser. No. 12/964,591, filed on Dec. 9, 2010, which claims priority from Japanese Patent Application No. 2010-251900 filed Nov. 10, 2010, which are hereby incorporated by reference herein in their entirety.

BACKGROUND OF THE INVENTION

1. Field of the Invention

The present invention relates to an inkjet recording apparatus and an inkjet recording method that record an image on a recording medium by ejecting ink and generating correction data on the basis of colorimetric results of the recorded image.

2. Description of the Related Art

With an inkjet recording apparatus including recording heads having a plurality of inkjet ejecting ports (nozzles), the recorded image will have uneven color density (nonuniform color density) due to a variation in the ejecting characteristic of the nozzles. With serial recording in which image recording is performed by scanning a recording head with respect to a predetermined area on a recording medium multiple times, uneven color density can be easily prevented by multi-path recording. On the other hand, it is difficult to prevent unevenness in color density by line-head single path recording in which an image is recorded in one scanning operation using a wide line head having a nozzle array corresponding to the width of a sheet.

To improve the quality of an image recorded with a line head, it is important to correctly measure and analyze the color density evenness and perform correction (output correction) during recording on the basis of the measurement and analysis results. Specifically, this is a technique that provides a high quality image by recording test patterns using the nozzles, measuring the color density through image analysis, and determining the recording color density. As such a technique, Japanese Patent Laid-Open No. 10-13674 discusses a head shading technique in which information about the volume of ink ejected from each ink ejecting nozzle is acquired, and the number of recording dots is modified in accordance with the information about ink volume. Furthermore, Japanese Patent Laid-Open No. 2000-334935 discusses a technique in which evenness is maintained by detecting abnormal nozzles and terminating use of such abnormal nozzles.

To correct unevenness in color density of a recorded image caused by a variation in the ejecting characteristic of nozzles, as described above, correction test patterns are recorded on the recording medium to be used, and color density data for generating correction data is acquired. At this time, there is a limit to the size of a usable recording medium. Therefore, in some cases, color density data for correcting all nozzles on a recording head may not be acquired at once. This will be described below.

FIG. 1 is a schematic view of a recording head and recording media. In the drawing, the recording medium is conveyed in the x direction, and the nozzle array on the recording head extends in the y direction. Details of the configuration and control of an inkjet recording head 111 will be described below. The widths of recording media 112 and 113 in the y direction depend on, for example, the product. The recording head 111 is capable of recording an image on an area wider than the width of the recording medium. The recording head 111 has such recording as a result of taking into consideration so-called "frameless recording" in which an image is record on the entire area of the recording medium, an error in the conveying conditions of the recording medium, and the manufacturing tolerance of the width of the recording medium. Therefore, the recording head 111 is designed to have a nozzle width greater than the maximum width (maximum guaranteed width) of a feedable recording medium.

Due to the above-described reason, image data corresponding to the nozzles of the recording head 111 should be corrected, and color density data is acquired by recording a correction test pattern and performing colorimetry on this. When the nozzle width of the recording head is greater than the maximum guaranteed width, color density data for only the nozzles corresponding to the maximum guaranteed width can be acquired in one recording operation. When cases in which the positions of the corrected nozzles and the recording medium are not aligned due to error in the conveying condition of the recording medium and frameless recording is performed are taken into consideration, there is a problem in that correcting only the nozzle corresponding to the maximum guaranteed width is insufficient.

SUMMARY OF THE INVENTION

To solve the problem described above, the present invention provides an inkjet recording apparatus configured to record an image on a recording medium by ejecting ink while relatively scanning a recording head with respect to the recording medium in a direction intersecting the predetermined direction, the recording head having a plurality of ejecting ports for ejecting ink arranged in a predetermined direction, the apparatus including a first correction-test-pattern recording unit configured to record a first correction test pattern using a first ejecting port group of ejecting ports continuously aligned from a first edge of the recording head, the number of ejecting ports in the first ejecting port group being smaller than the number of the ejecting ports of the recording head; a second correction-test-pattern recording unit configured to record a second correction test pattern using a second ejecting port group of ejecting ports continuously aligned in the predetermined direction, part of the ejecting ports in the second ejecting port group being selected from the ejecting ports in the first ejecting port group and from ejecting ports not included in the first ejecting port group; and a correction-data generating unit configured to generate correction data for correcting the image data corresponding to ejecting ports included in the first ejecting port group and the second ejecting port group on the basis of a colorimetric result of the first correction test pattern and a colorimetric result of the second correction test pattern.

According to the present invention, the correction test pattern is recorded multiple times at positions where the recording head and the recording medium are at different relative positions. In this way, data for correcting nozzles of a recording head having a width greater than the width of a feedable recording medium.

Further features of the present invention will become apparent from the following description of exemplary embodiments with reference to the attached drawings.

DESCRIPTION OF THE EMBODIMENTS

Embodiments of the present invention will be described in detail below with reference to the drawings. First, analysis of the color density of a printed image and output value correction by an inkjet recording apparatus will be described.

Basic Configuration of Inkjet Recording Apparatus

Figure 1:
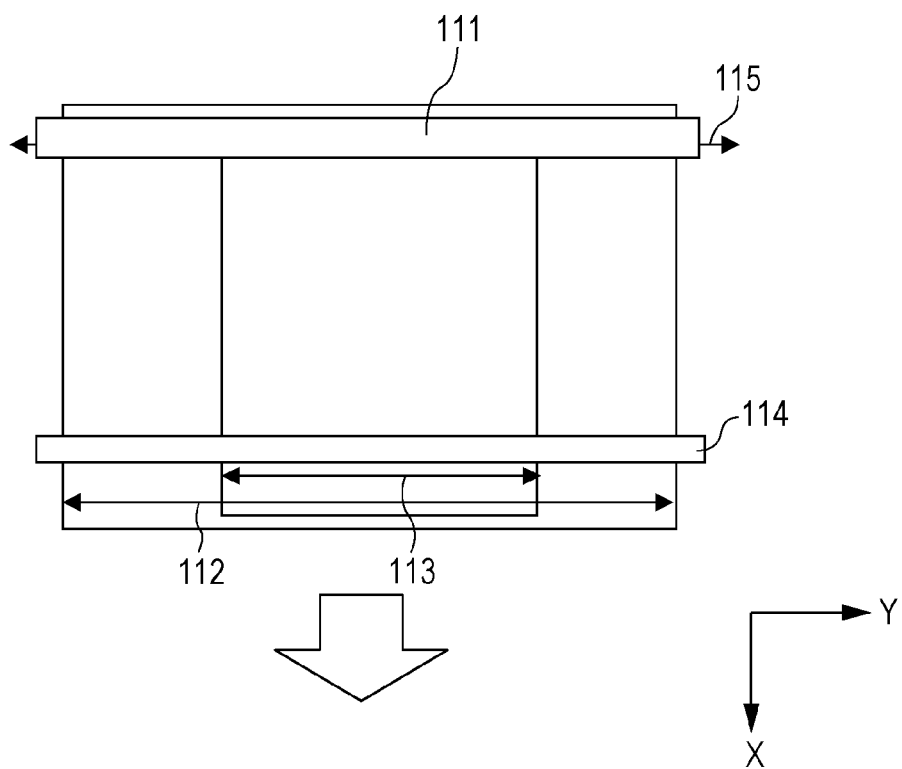
FIG. 1 illustrates the relationship between an inkjet printer and a recording medium.

FIG. 1 illustrates a relationship between an inkjet recording apparatus and recording media. A recording head 111 can move in the direction (y-direction) indicated by arrow 115. Recording media 112 and 113 have different widths in the y direction. Hereinafter, the recording media are referred to as "recording paper." However, the recording media are not limited to paper. In this embodiment, the recording paper 112 is a recording medium having the maximum size conveyable by the inkjet recording apparatus and having a width of 12 inches. The recording head 111 has a 12.9 inch nozzle width to allow errors due to paper cutting, change by extension and contraction of the recording paper due to temperature and/or humidity, and conveying errors. If the conditions are the same, a scanner 317, which is a reading device, may have a width that is the same as that of the recording head 111.

Figure 2:
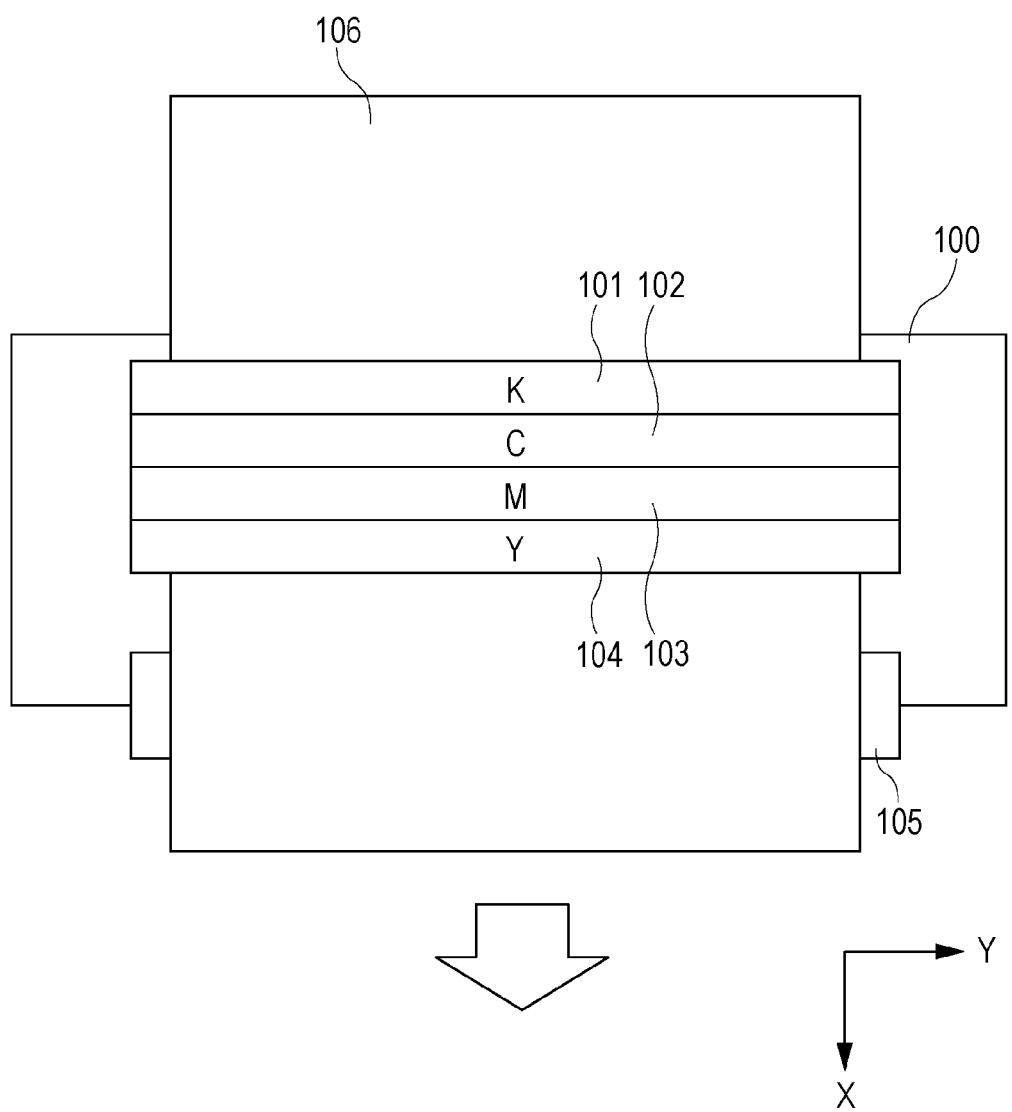
FIG. 2 illustrates an inkjet printer forming a color image.

FIG. 2 illustrates an inkjet recording apparatus that can record color images. An inkjet recording apparatus main body (printer) 100 is illustrated in the drawing. Recording heads 101 to 104 of the recording head 111 and respectively eject black (K), cyan (C), magenta (M), and yellow (Y) ink to record an image on recording paper 106. A line-feed motor 105 conveys the recording paper 106 in the x direction, which is the direction indicated by the arrow and orthogonal to the y direction. In this embodiment, the recording heads 101 to 104, respectively for KCMY ink, each have a plurality of ejecting ports (nozzles), which is each a minimum unit for ink ejecting and arranged along the y direction (or a predetermined direction). The recording heads 101 to 104 are each capable of recording an image on an area corresponding to the lateral width (y direction width) of the recording paper 106. Hereinafter, a recording head having such a configuration is referred to as "long head." By performing one ink ejecting operation with each of the CMYK recording heads 101 to 104, one raster of the output image is formed. By repeating the ink ejecting operation in synchronization with the conveying of the recording paper 106 by the line-feed motor 105, an image is formed on an entire page.

Figure 3:
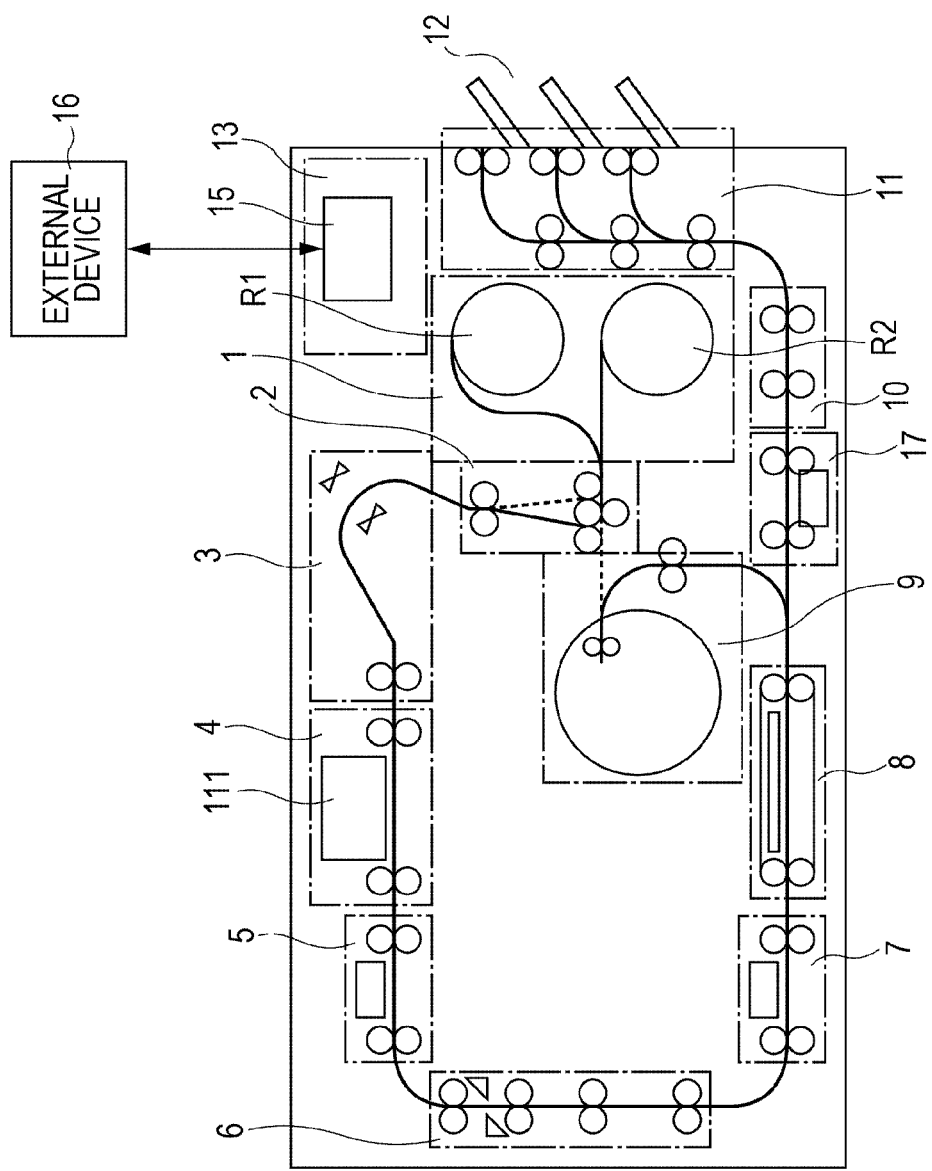
FIG. 3 is a schematic view of the internal configuration of a printer.

FIG. 3 is a schematic sectional view of the inner configuration of the inkjet recording apparatus. The inkjet recording apparatus according to this embodiment is a high-speed line printer capable of simplex and duplex printing and uses a continuous sheet wound into a roll as a recording medium. The main components disposed inside the printer are a sheet feeding unit 1, a decurling unit 2, a skew correction unit 3, a printing unit 4, an inspecting unit 5, a cutter unit 6, an information recording unit 7, a drying unit 8, a sheet winding unit 9, an ejection conveyance unit 10, a sorter unit 11, an ejection tray unit 12, and a control unit 13. A sheet is conveyed by a conveying mechanism, including a roller pair and a belt, along a sheet conveying path, which is indicated by a solid line in the drawing.

The sheet feeding unit 1 is a unit that retains and supplies a continuous sheet wound into a roll. The sheet feeding unit 1 is capable of accommodating two rolls R1 and R2 and selects one of the rolls to reel out and feed the sheet. The number of rolls to be stored is not limited to two and, instead, may be one roll or three or more rolls.

The decurling unit 2 is a unit that reduces the curling (warping) of the sheet fed from the sheet feeding unit 1. The decurling unit 2 uses one driving roller and two pinch rollers to apply a decurling force to the sheet by warps the sheet in a direction opposite to that of the curling. The skew correction unit 3 is a unit that corrects the skew (inclination relative to the proper conveying direction) of the sheet that has passed through the decurling unit 2. The skew of the sheet is corrected by pushing a guide member against the edge of the sheet that is used as a reference.

The printing unit 4 is a unit that forms an image on the sheet from the top side of the conveyed sheet with the recording head 111. The printing unit 4 includes a plurality of conveying rollers that convey the sheet. The recording head 111 is a line print-head unit provided with an inkjet nozzle array that covers the maximum width of the sheet to be used. The recording head 111 has a plurality of print heads arranged in parallel in the conveying direction. The inkjet method may be a method using a heater element, a piezoelectric element, an electrostatic element, or an MEMS element. Colored ink is fed from the ink tanks to the recording head 111 through corresponding ink tubes. The recording head 111 moves in the up-to-down direction on the sheet (z direction) to perform cap operation. Then, the recording head 111 moves in a direction perpendicular to the sheet (y direction). A mechanism that carries out such operation and a motor that drives the mechanism are provided.

An inspection unit 5 is a unit that optically reads inspection patterns and images printed on the sheet by the printing unit 4 and inspects the nozzle condition of the print heads, the sheet conveying condition, the image position, and so on. The cutter unit 6 is a unit including a mechanical cutter that cuts the printed sheet at predetermined lengths. The cutter unit 6 includes a plurality of conveying rollers that sends out the sheet to the next process. The information recording unit 7 is a unit that records printing information, such as serial numbers and dates of the printing, on the back side of the cut sheet. The drying unit 8 is a unit that heats the sheet printed at the printing unit 4 to dry the applied ink in a short amount of time. The drying unit 8 includes a conveying belt and a conveying roller that send out the sheet to the next process.

The sheet winding unit 9 is a unit that temporarily winds the continuous sheet on which front-side printing has been completed in the duplex printing mode. The sheet winding unit 9 includes a winding drum that rotates to wind the sheet. The uncut continuous sheet on which front-side printing has been performed is temporarily wound by the winding rotary member. When sheet is completely wound, the winding drum rotates in the reserve direction to send out the wound sheet and feed the sheet to the decurling unit 2 from where the sheet is sent to the printing unit 4. Since the sides of the sheet are reversed, printing can be performed on the back side by the printing unit 4. Details of the operation of duplex printing will be described below.

A reading unit 17 reads test patterns for maintenance of the printer heads printed at the printing unit 4. The ejection conveyance unit 10 is a unit that conveys the sheet cut at the cutter unit 6 and dried at the drying unit 8 to the sorter unit 11. The sorter unit 11 is a unit that sorts printed sheets into different groups, when required, into different ejection trays of the ejection tray unit 12. The control unit 13 is a unit that controls all units in the printing apparatus. The control unit 13 includes a CPU, a memory, a controller 15 having various input/output (I/O) interface, and a power source. The operation of the printing apparatus is controlled on the basis of instructions from the controller 15 or an external device 16 of a host computer connected to the controller 15 via an I/O interface.

Operation of Recording Medium During Simplex and Duplex Printing

Figure 4:
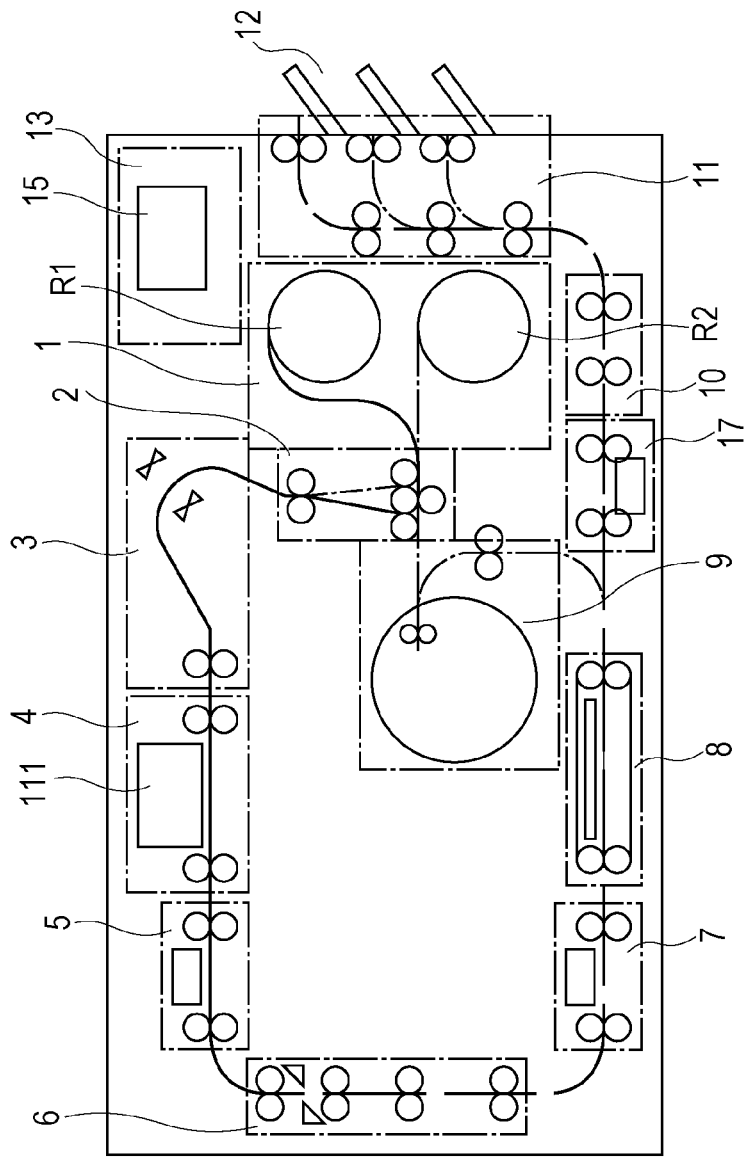
FIG. 4 illustrates the operation of simplex printing.

Next, the basic operation during printing will be described. Since the printing operations of a simplex printing mode and a duplex printing mode differ, each mode will be described below. FIG. 4 illustrates the operation of a simplex printing mode. A sheet conveying path of the sheet being fed from the sheet feeding unit 1, printed, and ejected to the ejection tray unit 12 is indicated by a heavy line in the drawing. Front-side printing is performed at the printing unit 4 on the sheet fed from the sheet feeding unit 1 and processed at the decurling unit 2 and the skew correction unit 3. The printed sheet that has passes through the inspection unit 5 is cut into sheet pieces having a predetermined length set in advance in the cutter unit 6. Print information is recorded on the back side of the cut sheet pieces by the information recording unit 7 as required. Each cut sheet piece is then conveyed to the drying unit 8 and dried. The dried cut sheet pieces are sequentially ejected through the ejection conveying unit 10 and stacked in the ejection unit 12 of the sorter unit 11.

Figure 5:
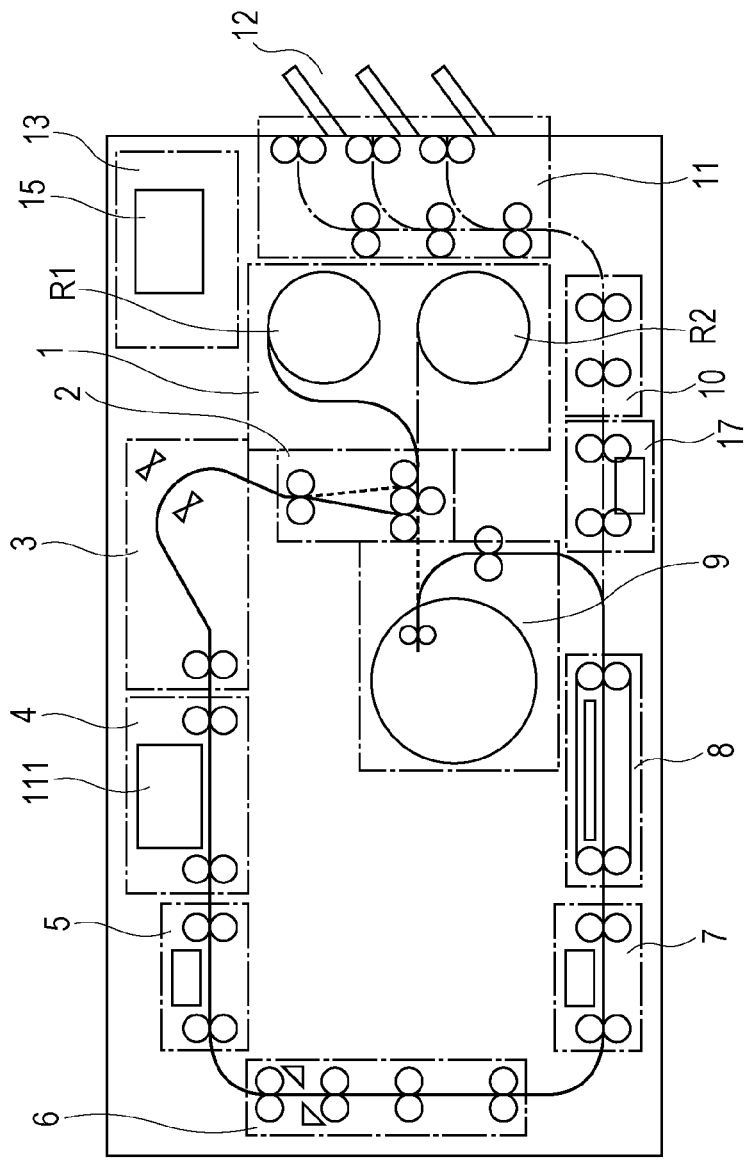
FIG. 5 illustrates the operation of duplex printing.

FIG. 5 illustrates the operation in the duplex printing mode. In the duplex printing mode, the back-side printing sequence is performed after the front-side printing sequence. The operations of the sheet feeding unit 1 through the inspection unit 5 in the front-side printing sequence are the same as those in the above-described simplex printing sequence. The sheet is not cut by the cutter unit 6 and is conveyed to the drying unit 8 as a continuous sheet. After drying the ink on the front side at the drying unit 8, the sheet is guided to the path to the sheet winding unit 9 and does not enter the path to the ejection conveying unit 10. The guided sheet is wound up by the winding drum of the sheet winding unit 9, which is rotating in the forward direction (counterclockwise in the drawing). When the planned front-side printing is completed by the printing unit 4, the rear edge of the printing area on the continuous sheet is cut by the cutter unit 6. The continuous sheet on the downstream side of the cutting position in the conveying direction (printed portion of the continuous sheet) passes through the drying unit 8 and is entirely wound to its rear edge (cutting position) by the sheet winding unit 9. Simultaneously, the continuous sheet remaining on the upstream side of the cutting position in the conveying direction is rewound by the sheet feeding unit 1 so that the front edge of the sheet (cutting position) does not remain in the decurling unit 2.

After the above-described front-side printing sequence is performed, the back-side printing sequence is performed. The winding drum of the sheet winding unit 9 rotates in a direction opposite to the rewinding direction (i.e., in the clockwise direction in the drawing). The edge of the wound sheet (the rear edge during winding is the front edge during feeding) is fed to the decurling unit 2. Decurling in the direction opposite to that described above is performed at the decurling unit 2. This is because the sheet wound around the winding drum has curls in the opposite direction since it is wound such that the front and back sides are reversed compared to when the sheet is wound around the sheet feeding unit 1. Then, the sheet is passed through the skew correction unit 3 and printing is performed on the back side of the continuous sheet at the printing unit 4. The printed sheet that has passes through the inspection unit 5 is cut into sheet pieces having a predetermined length set in advance in the cutter unit 6. Since printing is performed on both sides of the cut sheet pieces, recording is not performed at the information recording unit 7. Each cut sheet piece is then conveyed to the drying unit 8, sequentially ejected through the ejection conveying unit 10, and stacked in the ejection unit 12 of the sorter unit 11.

Operation during maintenance including the above-described output correction is the same as that of simplex printing. A test pattern for maintenance of the printer heads is printed at the printing unit 4 on the sheet fed from the sheet feeding unit 1 and processed at the decurling unit 2 and the skew correction unit 3. The printed sheet that has passes through the inspection unit 5 is cut into sheet pieces having a predetermined length set in advance in the cutter unit 6. Each cut sheet piece is then conveyed to the drying unit 8 and dried. After dried, the test pattern on each cut sheet piece is read at the reading unit 17. Then, each cut sheet piece is ejected through the ejection conveying unit 10 and stacked in the ejection unit 12 of the sorter unit 11.

System Configuration

Figure 6:
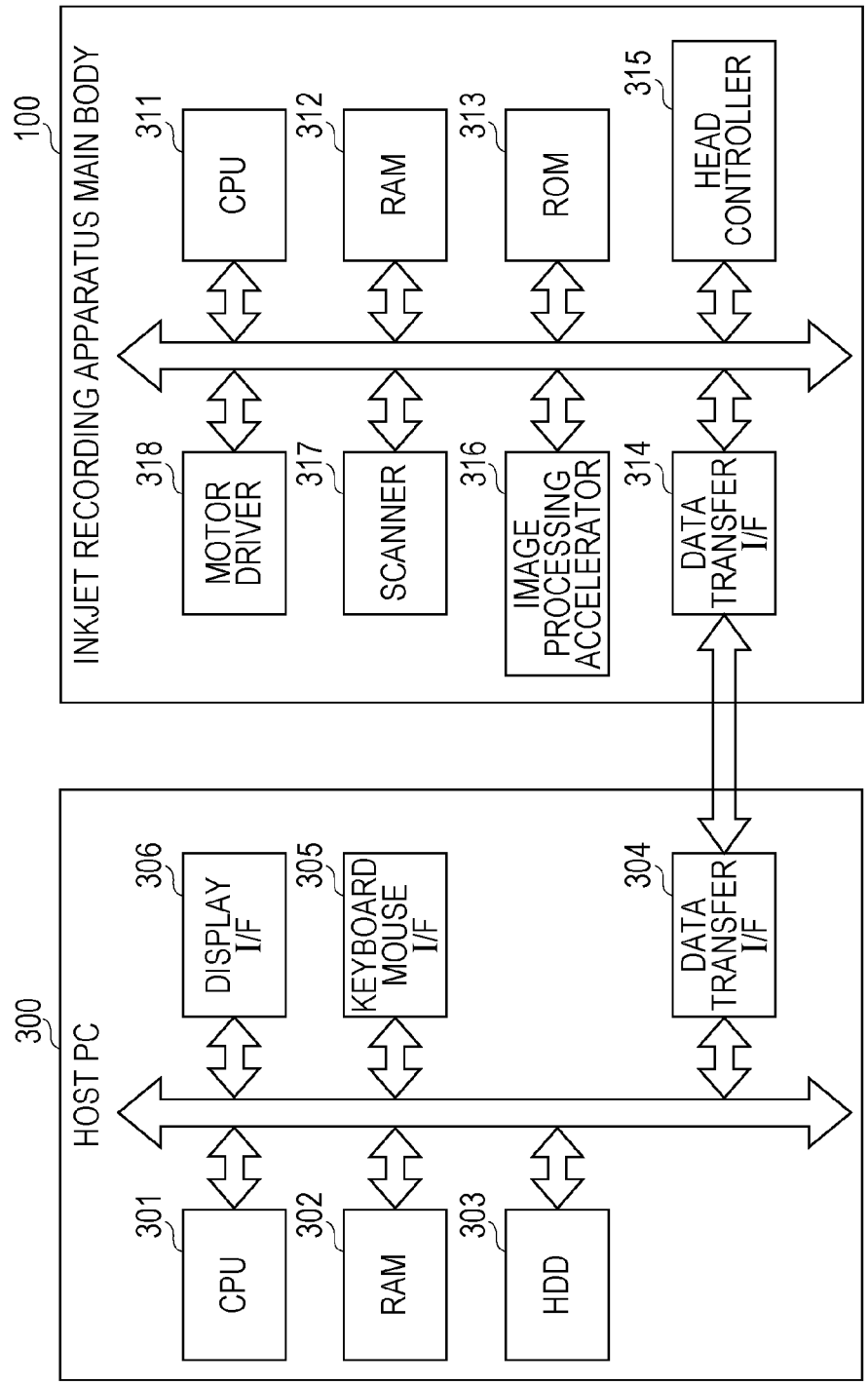
FIG. 6 illustrates an example system configuration.

FIG. 6 illustrates an example system configuration according to the present invention. The drawing illustrates the inkjet recording apparatus main body 100 in FIG. 1 and a host PC 300 that sends print data to the inkjet recording apparatus.

The host PC 300 mainly includes the following blocks. A CPU 301 carries out processing on the basis of programs stored in an HDD 303 and a RAM 302. The RAM 302 is a volatile storage and temporarily holds programs and data. The HDD 303 is a volatile storage and temporarily holds programs and data. A data transfer interface (I/F) 304 transmits and receives data to and from the inkjet recording apparatus main body 100. Physical connection is established by USB, IEEE 1394, LAN, or the like. A keyboard mouse I/F 305 is an interface that controls human interface devices (HIDs), such as a keyboard and a mouse, and receives input from a user. A display I/F 306 displays an image on a display unit.

The inkjet recording apparatus main body 100 mainly includes the following blocks. A CPU 311 carries out processing on the basis of programs stored in an ROM 313 and a RAM 312. The RAM 312 is a volatile storage and temporarily holds programs and data. The ROM 313 is a volatile storage and temporarily holds programs and data. A data transfer interface (I/F) 314 transmits and receives data to and from the host PC 300. A head controller 315 supplies print data to the recording heads that actually prints an image and controls the printing. Specifically, the head controller 315 may be designed to read necessary parameters and data from predetermined addresses in the RAM 312. When the CPU 311 writes necessary parameters and data at predetermined addresses in the RAM 312, the head controller 315 is started up to carry out the actual printing. An image processing accelerator 316 carries out image processing at a speed faster than the CPU 311. Specifically, the image processing accelerator 316 may be designed to read in necessary parameters and data from predetermined addresses in the RAM 312. When the CPU 311 writes necessary parameters and data in the predetermined addresses, the image processing accelerator 316 is started up to perform the actual printing. The image processing accelerator 316 is not absolutely necessary and image processing may be carries out merely by the CPU 311. A scanner 317 controls the inspection unit 5 and the reading unit 17, which are illustrated in FIG. 3, and stores read data to a RAM. Furthermore, the scanner 317 reads and analyzes color density and performs color space conversion of the color space of the reading device, which is required for correcting the output characteristic of the recording apparatus. An LUT method may be employed or arithmetic processing may be performed for high-speed processing. A motor driver 318 conveys the recorded paper and moves the recording head 111, which is illustrated in FIG. 3, in the y and z directions.

Maintenance Operation

Next, the maintenance operation according to this embodiment will be described. The maintenance operation according to this embodiment prevents a decrease in image quality due to a variation in the ejecting volumes of the recording heads, a color deviation in multiple colors, which is described below, nonuniform reading by the scanner, uneven drying, and so on. Thus, in this embodiment, correction test patterns are recorded, and, from the colorimetry results thereof, color density data for generating correction data is acquired.

Figure 7:
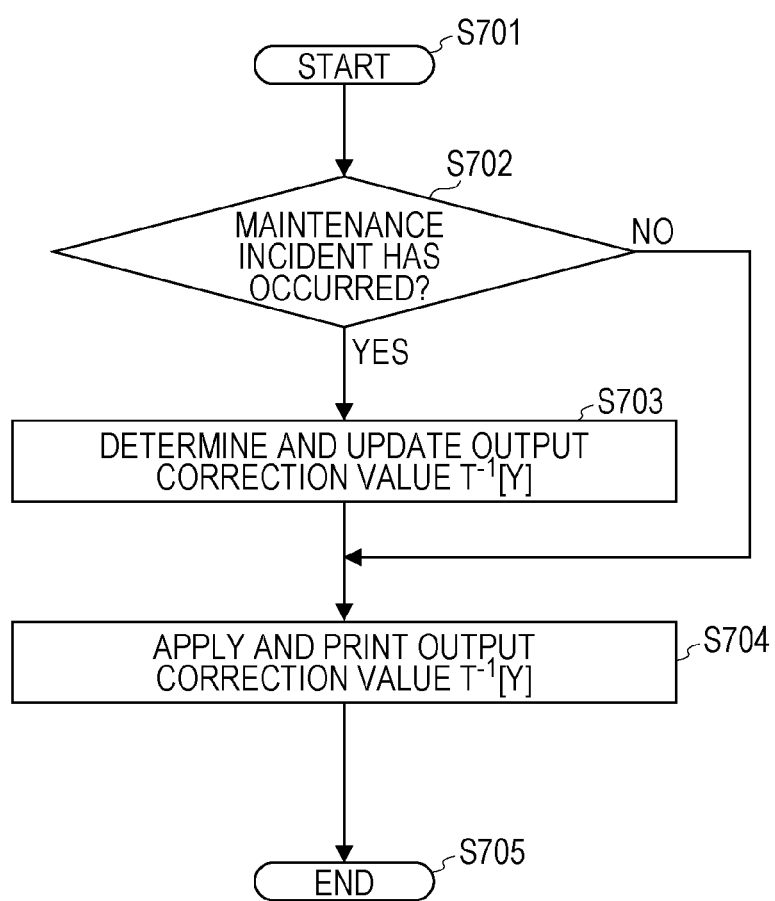
FIG. 7 illustrates the flow of a process.

FIG. 7 illustrates a processing flow of the maintenance operation according to this embodiment. The processing starts from Step S701. In Step S702, a conditional judgment is made to determine whether a maintenance incident has occurred. Whether a maintenance incident has occurred is determined at power-on. By making the conditional judgment after performing self-diagnosis at power-on about whether maintenance is required, the downtime when maintenance is not required and the consumption of recording paper and ink can be reduced. By providing a user interface that enables a user to instruct maintenance, the maintenability is improved. By performing maintenance by using a timer provided in the apparatus at predetermined intervals through which degradation in the characteristics occur, the maintenability is improved. Instead of basing the timing of performing maintenance on time intervals, maintenance may be performed on the basis of the number of ink dots ejected by counting the number of ejected ink dots and performing maintenance each time the number exceeds a threshold. When a maintenance incident has not occurred and maintenance is not required, Step S703 may be skipped to go to Step S704. When maintenance is performed, in Step S703, an output correction value $T^{-1}[Y]$ is calculated through a method described below with reference to FIG. 9, and data is updated. In Step S704, an output correction value $T^{-1}[Y]$ based on predetermined correction data is applied, and recording is performed. An application example of the output correction value is illustrated in FIG. 8.

Image Processing Flow

Figure 8:
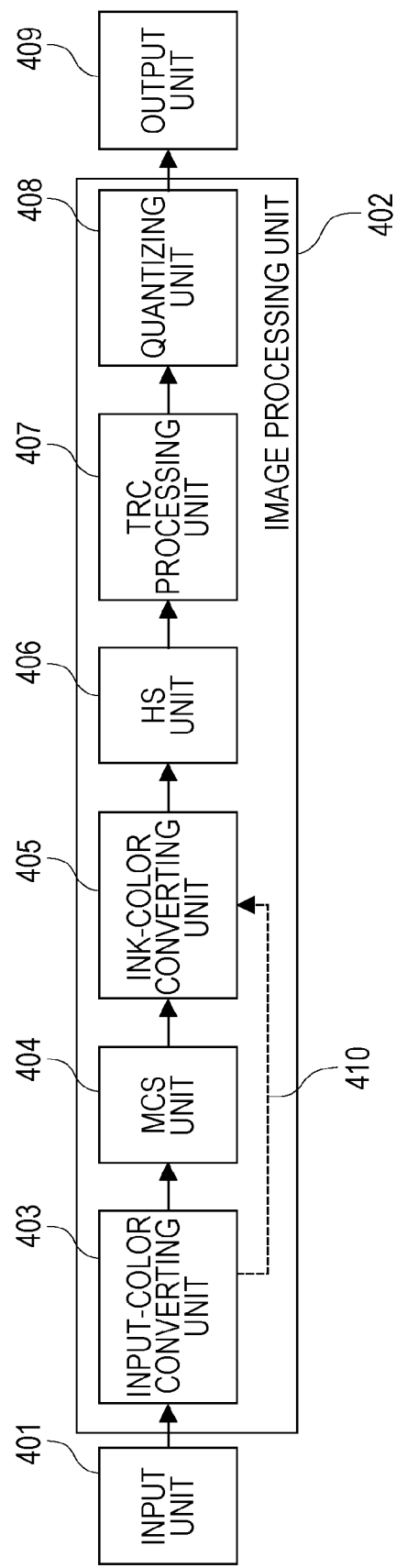
FIG. 8 is a block diagram illustrating an example configuration of an image processing unit.

FIG. 8 is a block diagram illustrating an example configuration of an image processing unit that carries out image processing for an inkjet printer. An image processing unit 402 receives image data of a target pixel to be image processed from an input unit 401 and outputs the image processed image data to an output unit 409. The image processing unit 402 includes an input-color converting unit 403, a multi-color shading (MCS) unit 404, an ink-color converting unit 405, a head shading (HS) unit 406, a tone reproduction curve (TRC) processing unit 407, and a quantizing unit 408.

The input-color converting unit 403 converts input image data to device color-image data. The input image data is a color signal containing three elements and is input with an information format indicating color coordinates in a color space coordinate system, such as sRGB for colors on a monitor. The input image is converted to device color-image data, which is a color signal containing three elements, through a known method, such as matrix computation or three-dimension look-up table (LUT) processing described in Japanese Patent Laid-Open No. 10-13674. In a three-dimension LUT, combinations of input image data (R, G, B) and converted device color-image data (R', G', B') are stored. For example, when color elements independently change in three steps, such as R=0, 128, 255, G=0, 128, 255, and B=0, 128, 255, the table will contain a total of 27 (3×3×3=27) combinations.

The MCS unit 404 corrects device the color-image data that has been input-processed and converted and outputs device color-image data with less color unevenness.

The ink-color converting unit 405 converts the MSC-processed device color-image data to ink color data containing a plurality ink color signals. Specifically, the ink-color converting unit 405 receives the device color-image data and converts it to ink color data corresponding to the number of ink colors using a known method, such as matrix computation, three-dimension LUT processing, or under-color removal, described in Japanese Patent Laid-Open No. 10-13674.

For the printer illustrated in FIG. 1, since the recording head 111 has a total of four recording heads, i.e., black 101, cyan 102, magenta 103, and yellow 104, the device color-image data is converted to ink color data corresponding to four colors.

The HS unit 406 converts the input ink color data to ink color data corresponding to the ejecting volume of the nozzles in each recording head for each ink color and outputs ink color data with less color density unevenness in single ink color recording. Head shading (HS) is performed, specifically, using a known method, such as one-dimension LUT processing, which is described in Japanese Patent Laid-Open No. 10-13674.

The TRC processing unit 407 receives HS processed ink color data and converts the ink color data for each ink color to ink-dot number data. Tone reproduction curve processing is performed, specifically, using a known method, such as one-dimension LUT processing, which is described in Japanese Patent Laid-Open No. 10-13674.

The quantizing unit 408 receives the TRC processed ink-dot number data, performs quantization, and outputs quantized data. In quantization, various quantization levels, such as two-level and three-level through sixteen-level, exist. Usually, during two-level processing, the CMYK ink-dot number data items are each converted to 1-bit data with and without ink dots for each of the CMYK. As a method of quantization, a known pseudo continuous tone processing, such as a dither matrix method or an error diffusion method, is used. Instead, however, depending on the use of the output image, simple quantization may be used. The quantized ink data is sent to the output unit 409.

At the output unit 409, the different colored ink is ejected from the nozzles to record an image on a recording medium on the basis of the quantized ink data. Specifically, ink is ejected from the recording heads 101 to 104, which are illustrated in FIG. 1, to record an image on the recording paper 106.

The basic process of output value correction according to this embodiment has been described above. According to the present invention, the order of the steps in the process is not limited to that described above and an LUT may be prepared for high-speed processing.

Characteristic Configuration: Segmented Printing

Next, a method of generating correction data for a recording head, which is the characteristic configuration of the present invention, will be described. As described above, since the ejecting volume of each nozzle differs due to manufacturing tolerance of the recording head, image data corresponding to each nozzle (each ejecting port) or to each predetermined unit of nozzles should be corrected. In this embodiment, a test chart containing a plurality of correction test patterns is recorded on a recording medium and read by a reading device, such as a scanner, for colorimetry, and then, based on the acquired colorimetric results, correction data is generated.

At this time, depending on the width of the recording heads and the recording medium, a test pattern corresponding to a desired number of nozzles may not be acquired in one recording operation. The recording head 111 according to this embodiment takes into consideration conveying errors of the recording medium and frameless printing and, thus, has a nozzle width of 12.9 inches, which is greater than the maximum feeding width, i.e., 12 inches, of the recording medium. Nozzles in an area having a width greater than 12 inches, which is the maximum feeding width of the recording medium, should be corrected. However, since the test pattern is recorded with a maximum width of 12 inches, a test patter for the nozzles requiring correction cannot be obtained. To deal with such a problem, in the present invention, correction data for nozzles requiring correction is generated on the basis of a plurality of correction test patterns formed through segmented printing in which the recording heads and the recording medium are disposed at different relative positions and a test pattern is recorded at each position.

According to the present invention, repeatability errors that occur when a plurality of test charts formed through segmented printing performed with the recording heads and the recording medium disposed at different relative positions can be reduced. In an ideal system, normal printing can be performed after output correction even when analysis results obtained by performing segmented printing at each relative position are used. However, after performing segmented printing, a noise component other than a variation in the ejecting volume is generated before analysis is performed. Hereinafter, such a noise component is referred to as "repeatability error." When such repeatability errors cumulate, a color difference occurs at the borders in a recorded image on which output correction is performed using correction data prepared by segmented printing. When the color difference exceeds the visual limit, it is visibly recognized as a flaw in the image. Such a repeatability error is caused by nonuniformity in the properties of the recording paper surface, unevenness in air currents generated during high-speed conveying of the recording paper, a color density rise due to drying of the ink on the ink head surface, nonuniformity of the infrared heater surface of the drier, unevenness in drying air, and/or unevenness in drying due to the nonuniformity in the properties of the recording paper surface. Furthermore, at the scanner that reads the test patterns, electrical noise is generated during photoelectric conversion or at an analog circuit.

For analyzing an ejecting error in the recording head, such as a misdischarged nozzle, simply, it is determined whether a nozzle has a defect and if so, the position of the defected nozzle is determined. Therefore, the required precision for the difference between data items acquired through segmented printing is low. However, when the color density output characteristic is controlled, as in this embodiment, color density set by the ejecting characteristics, such as ejecting volume and ejecting timing, should be analyzed at high precision, and, hence, the repeatability error becomes an issue. According to the present invention, by performing correction for each segmented printing operation, such a repeatability error can also be reduced. Segmented printing will be described in detail below with reference to the flow chart in FIG. 9.

Figure 9:
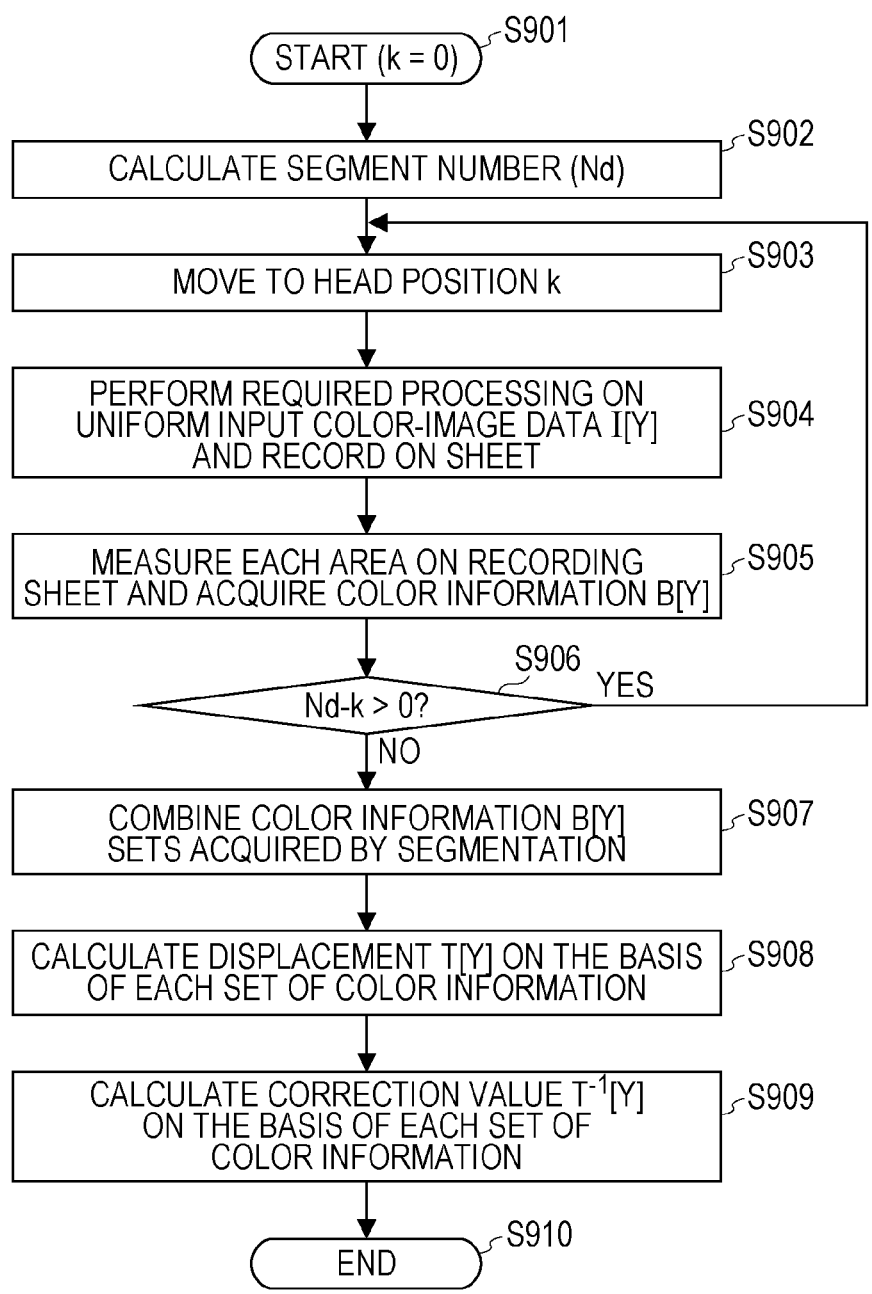
FIG. 9 illustrates a flow.

FIG. 9 illustrates the process in Step S703 in FIG. 7 of calculating the output correction value $T^{-1}[Y]$. In Step S901, the counter is cleared, and the processing is started. In Step S902, a segment number Nd is determined on the basis of the paper width of the recording medium in the direction of the nozzle array of the recording head on which maintenance is to be performed and the nozzle width of the recording head. The segment number Nd is determined by the following expression.

$$\text{segment number } Nd = int(\text{recording medium width}/\text{nozzle width} + 1.0)(\text{where}, int \text{ is rounded off}) \quad (1)$$

Specifically, when recording paper having widths of 5 to 12 inches is used, the segment number Nd of a 5-inch wide recording paper is three, and the segment number Nd of a 12-inch wide recording paper is two. Maintenance can be performed on the entire nozzle width of the recording head even on paper with a small width, regardless of the problems of paper width and conveying error. Next, in Step S903, the recording head is moved to a predetermined position. Hereinafter, the position of the recording head relative to the recording medium is referred to as a head position (HP). When the recording head is moved three times, the positions are sequentially referred to as a head position 1 (HP1), a head position 2 (HP2), and a head position 3 (HP3). In Step S904, processing required for uniform input color-image data I[Y] is carried out, and correction test patterns are recorded on the surface of the recording paper. At this time, the test pattern recorded at the HP1 is referred to as "first correction test pattern," and the test pattern recorded at the HP2 is referred to as "second correction test pattern."

Figure 10A:
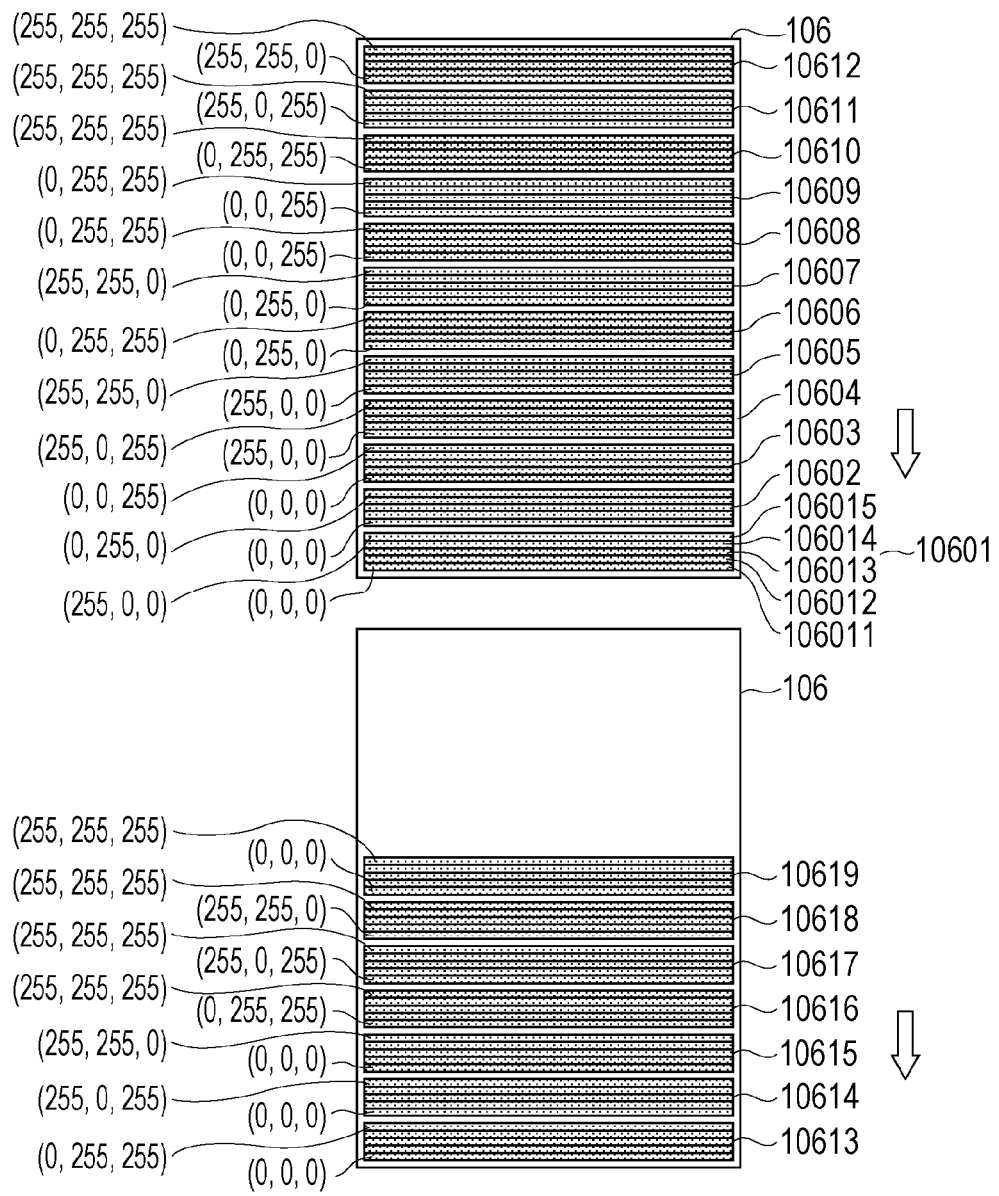
FIGS. 10A and 10B illustrate a test pattern and a pattern required for position detection.

FIG. 10A illustrates example correction test patterns. The following description is based on 8-bit data in an RGB color space. (255, 255, 255) represents white, (255, 255, 0) represents yellow, (255, 0, 255) represents magenta, and (0, 255, 255) represents cyan. An intermediate tone pattern may be printed when needed. Mixed color patches, such as a two-level color, a three-level color, or a four-level color, which are combinations of ink dots, may be used. In this embodiment, a one-level color and a two-level color will be described since variation and fluctuation in the ejecting volume of ink nozzles can be accepted and the printing volume of required test patterns can be optimized.

In Step S905, the reading unit 17, which is illustrated in FIG. 3, reads the test chart recorded in Step S904 and measures each area on the recording paper to acquire color information B[Y]. At this time, the values obtained by reading the test chart should be analyzed to determine which nozzles in the nozzle array of the recording head corresponds to which values. In the past, it was difficult to determine the positions of the nozzles or minute areas for correcting the nozzles due to influences of, for example, conveying errors and/or scanner aberration. In this embodiment, this problem is solved by recording patterns for detecting nozzle positions, as illustrated in FIG. 10B, simultaneously with the correction test patterns.

Figure 10B:
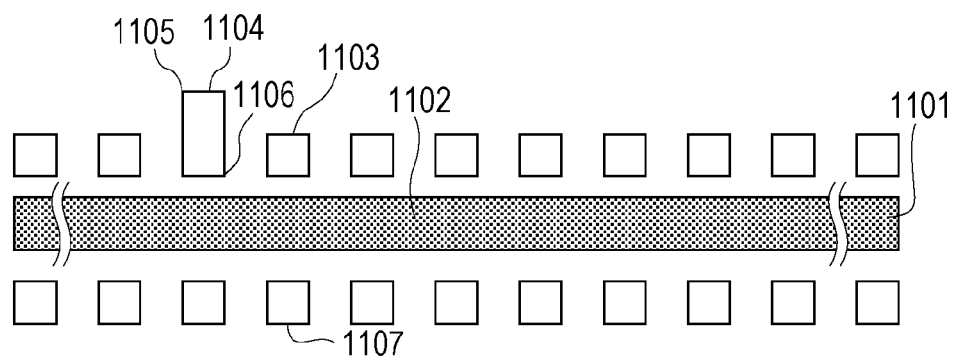

FIG. 10B is an enlarged view of pattern 106011 in the correction test patterns illustrated FIG. 10A. A pattern 1101 is formed by uniform color input data. Position detection marks 1103 are provided near a pattern 1102 for position detection of the read data. A mark 1104 is provided for detecting the positional relationship with respect to a specific nozzle.

Edge searching is performed on the detection mark to calculate coordinates. By selecting, in advance, a specific nozzle for printing a position detection pattern, the relative relationship of the nozzle position of the position detection pattern and the nozzle used for forming the reading pattern can be determined. In this way, the absolute position of the nozzle used for forming the reading pattern can be calculated.

The intervals of the position detection marks 1103 may be determined on the basis of conveying precision and aberration of the scanner optical system. To improve the precision, the pattern 1102 may be desirably interposed between the position detection marks 1103 and position detection marks 1107. When reliability of the position precision is required, such as in division analysis, it can be determined whether the width is greater than a predetermined value on the basis of edges 1105 and 1106 of the position detection mark 1104 so as to achieve a prescribed position detection precision to cope with a defect, such as misdischarge.

Preprocessing, such as shading correction of the scanner and/or trimming, is performed on the information read by the scanner. When reading is possible with a resolution of at least the minimum unit in the y direction in which output value correction is performed, it is desirable to process data of a plurality of pixels at this stage since the influence of unreliable sudden noise and/or dust, such as powered paper attaching to the surface of the recording paper and/or the reading scanner, can be reduced. Addition or averaging is performed in an area smaller than or equal to that required for output value correction. Since the output value correction is performed in the nozzle direction (y direction), it is desirable that the number of additions in the y direction be different from the number of additions in the x direction. Taking into consideration the conveying precision in the x direction, it is desirable that the number of additions in the x direction not be the same as the correction unit for adjoining areas.

After carrying out the above-described processing, luminance data is converted to color density data. Conversion may be performed through log conversion or by using the characteristics of the scanner as a profile.

Next, in Step S906, the segment number and the number of processing operation are compared, and a required number of processing operations is carried out. When processing operations corresponding to the segment number Nd is completed, the process proceeds to Step S907. In Step S907, the color information B[Y] acquired in segments is combined using the method described below. Then, in Step S908, the displacement amount T[Y] in each area is determined for the entire width of the nozzles of the recording head on the basis of corresponding color information. In Step S909, the output correction value $T^{-1}[Y]$ for the each area is calculated for the entire width on the basis of corresponding color information. In Step S910, the determined output correction is stored in the memory, and the process ends.

Y-Movement Printing and Measurement

Figure 11A:
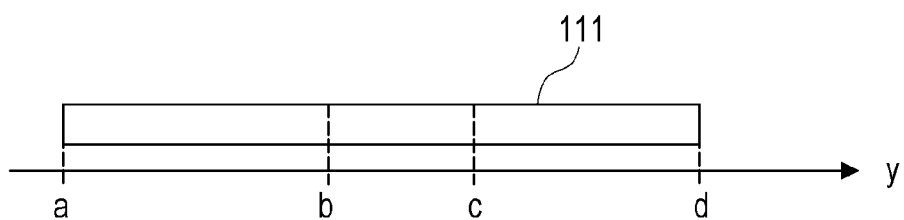
FIGS. 11A and 11B illustrate recording of a test chart at multiple head positions.
Figure 11B:
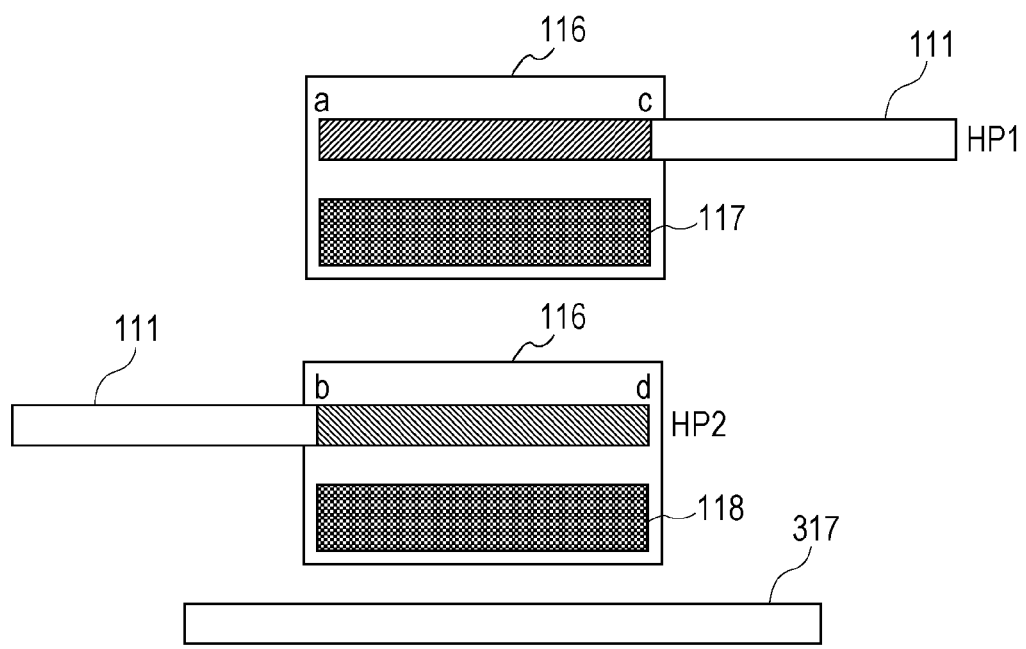

In step S907, a method of combining the color information B[Y] acquired in segments will be described in detail below. FIGS. 11A and 11B are schematic views of the position of the recording head. FIG. 11A illustrates the position of the recording head 111 in the y direction. FIG. 11B illustrates the position of the recording head 111 with respect to a recording medium 116. A state in which correction test patterns are recorded using nozzles in the area a-c and areas b to d of the recording head 111 is illustrated. Among the nozzles disposed in the recording head 111, nozzles in the area a-c, which are continuously aligned from the edge a, are referred to as "first nozzle group (first ejecting port group). The position of the recording head at which recording is performed using this nozzle group is referred to as "head position 1 (HP1)." Similarly, nozzles in the areas b to d are referred to as "second nozzle group (second ejecting port group). The position of the recording head at which recording is performed using this nozzle group is referred to as "head position 2 (HP2)." A test chart 117 is recorded at the HP1, and a test chart 118 is recorded at HP2. The scanner 317, which is the reading device according to this embodiment, is also provided. To illustrate the position in the y direction, the scanner 317 is adjacent to the recording head 111 in the x direction.

Figure 12A:
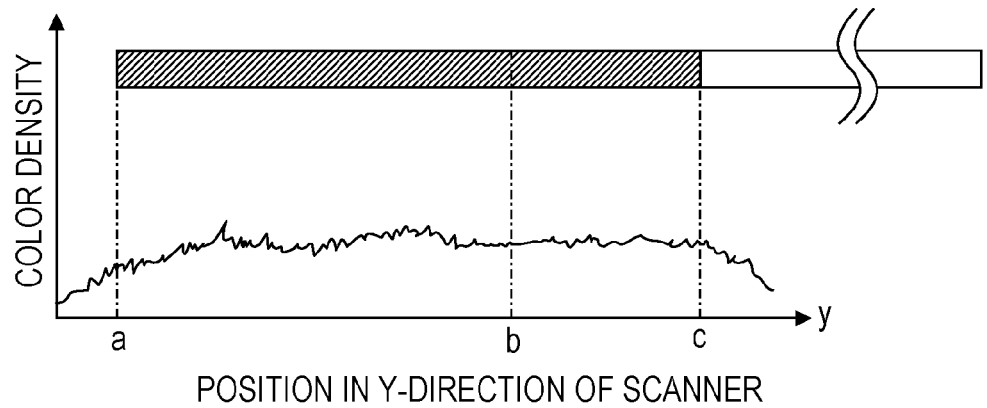
FIGS. 12A and 12B illustrate scanning color density of a test chart print chart.
Figure 12B:
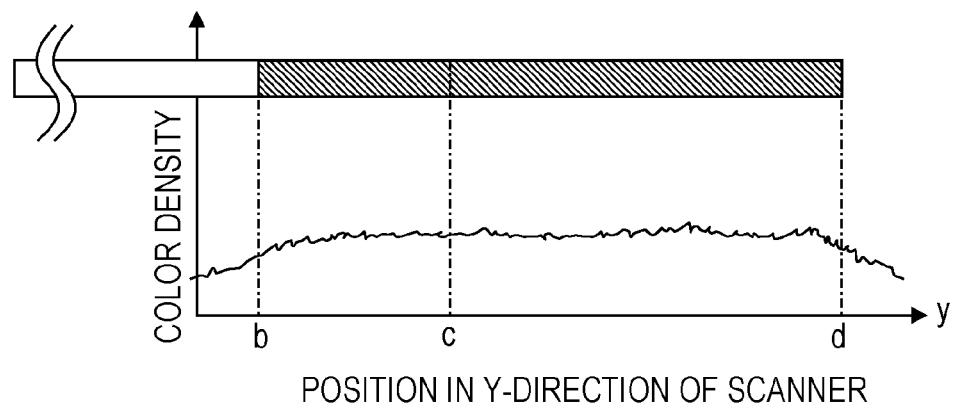

FIGS. 12A and 12B illustrate color-density-converted data obtained by scanning the test patterns in the test charts at the HP1 and the HP2. The horizontal axis represents the position of the recording head in the y direction corresponding to the reading by the scanner. The vertical axis represents color density. When test patterns of multiple colors and color density are recorded for a test chart, data sets corresponding to the number of test patterns are prepared. FIG. 12A illustrates the colorimetric result of the test patterns recorded at HP1, which is color density data recorded using the first nozzle group (first ejecting port group). Similarly, FIG. 12B illustrates the colorimetric result of the test patterns recorded at HP2, which is color density data recorded using the second nozzle group (second ejecting port group). The positions corresponding to nozzles in the area a-d on the recording head are illustrated.

The data acquired in segments is combined on the basis of the data acquired by reading the test patterns. However, there is a problem in scanner reading in that the edge sections of the recording medium cannot be read correctly because they are easily influenced by the base color. Accordingly, in this embodiment, the data segments are combined using data from positions where this influence at the edge sections of the recording medium can be ignored. This will be described with reference to FIGS. 13A and 13B.

Figure 13A:
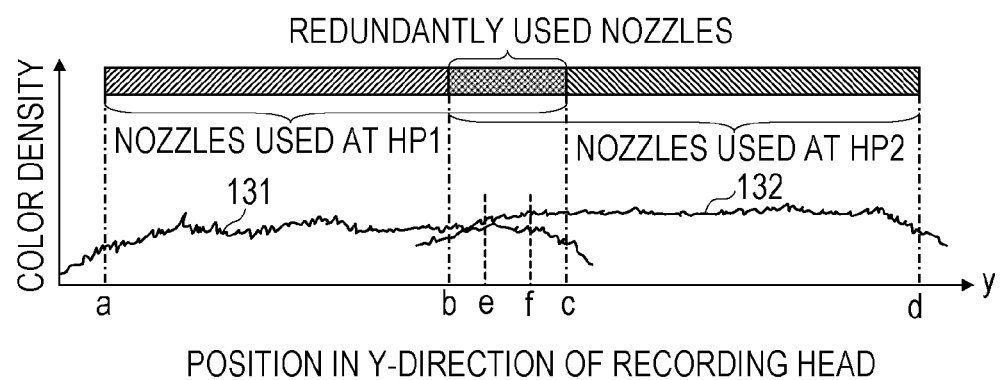
FIGS. 13A and 13B illustrate the color density characteristic of the test chart print chart.

FIG. 13A illustrates color density data 131 of a test pattern at the calculated HP 1 overlapping color density data 132 of a test pattern at the calculated HP2. At each head position, nozzles in the area from b-c in the first and second nozzle groups are used redundantly. Nozzles in the overlapping area b-c are referred to as "third nozzle group (third ejecting port group). Based on color density data of the area recorded using the third nozzle group, the color density data sets are combined to generate correction data. In this embodiment, the area f-c at HP1 represents an area in which reliability is not assured when reading the recorded test patterns with the scanner. This is the same for the area b-e at HP2. Thus, by combining the color density data sets of the area e-f, the influence on the edge sections of the recording medium can be suppressed. In this way, when recording test patterns in segments, such an area in which reliability cannot be assured should be taken into consideration to desirably select the size of a recording medium such that redundantly used nozzles in the area b-c (third ejecting port group) are included.

When the color density data sets acquired through multiple recording operations do not match and differ greatly, accurate data cannot be acquired even when areas in which reliability is not assured when reading with the scanner are avoided. In the area e-f in FIG. 13A, there is a difference in the color density data 131 and the color density data 132, which is due to the above-described repeatability error. The repeatability error could be influenced by the ejecting precision of ink, the position precision of ejected ink being attached to the recording medium, variation of the surface of the recording medium, fluctuation in drying, fluctuation in scanner readings, and/or electrical noise due to photoelectric conversion. In particular, unevenness in drying is caused by the position of printed ink, nonuniformity in the recording medium, and nonuniformity in heat wind and infrared rays and tends to be highly random. The repeatability error does not cause a problem in quality when output correction is performed by recording the test pattern at once. However, aberration may be generated when output correction is performed by combining test patterns recorded through segmented recording performed multiple times.

According to this embodiment, a number of data sets required by the additivity of variance of the randomly occurring causes is multiplied.

$$\text{number of multiplications}=(\text{actual number of errors}/\text{desired number of errors})^2 \quad (2)$$

In this embodiment, with respect to the desired number of errors, the actual number of errors can be estimated during product design from an S/N ratio due to noise, etc. In accordance with the estimated number, the required overlapping width is calculated. By allotting the number of multiplications in the x direction within a restricted range of conveying precision, position detection, and correction, as described above, the resolution of the performance analysis correction of the nozzles can be prevented from being reduced. The required number of additions may be determined by measuring the actual use condition to set the required overlapping width.

Figure 14:
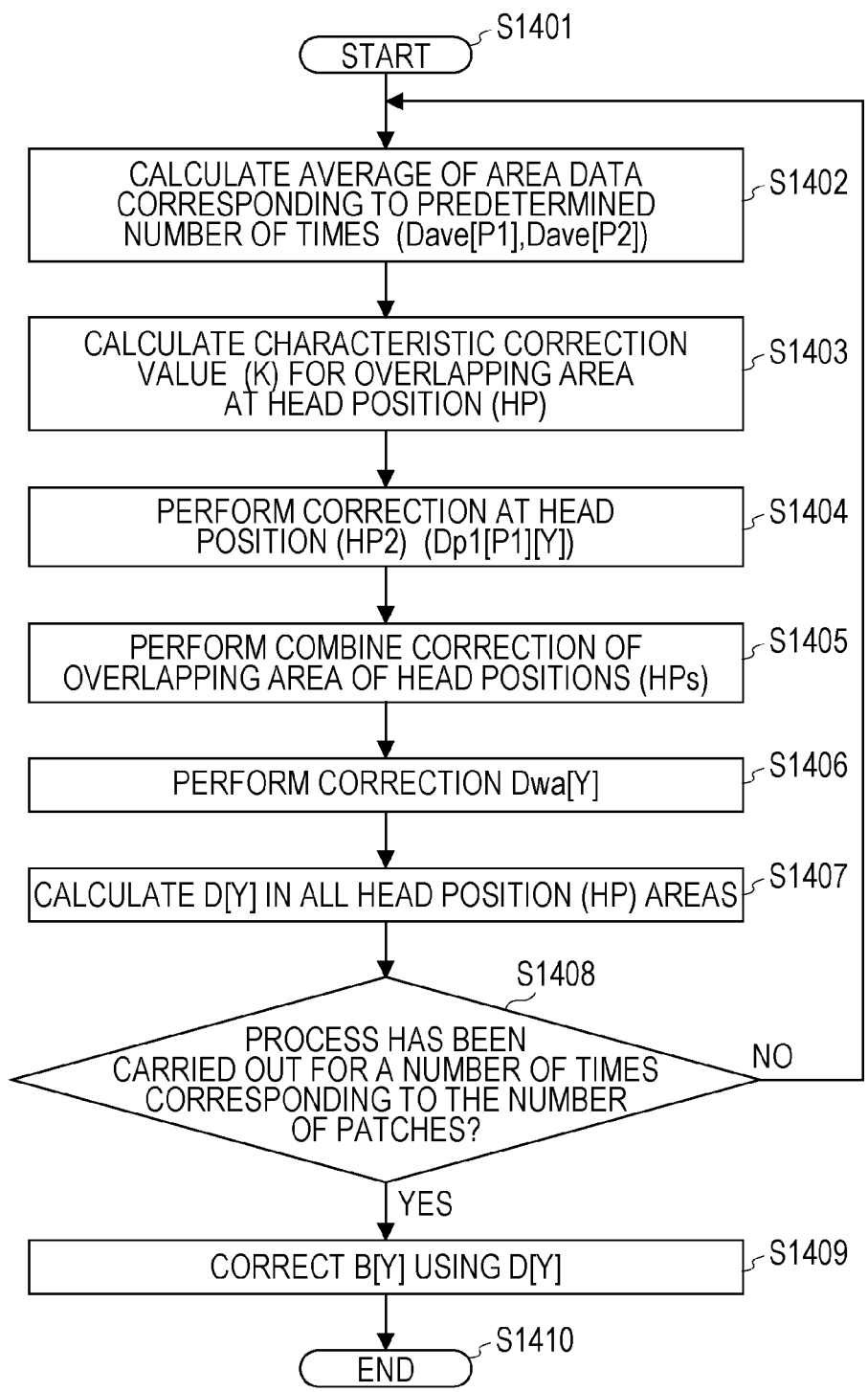
FIG. 14 illustrates processing carried out on an overlapping area.

FIG. 14 illustrates a flow for correction according to this embodiment. First, analysis and correction are performed to correct the repeatability errors among the head positions (HPs). Then, edge-section processing is carried out for analysis and correction for reducing aberration generated at the joining section (nozzle overlapping areas) of the head positions (HPs).

The process begins in Step S1401. In Steps S1402 and S1403, the characteristic difference in the overlapping areas at the head positions (HP) is calculated. In this embodiment, a ratio is determined from the average value of color density data of the area e-f of the nozzles.

The color density data acquired by reading the patterns recorded at the HP1 is represented by D[P1] [Y](a≤Y≤c). Similarly, the color density data acquired by reading the patterns recorded at the HP2 is represented by D[P2] [Y] (b≤Y≤d). Here, Y represents the nozzle positions of the recording head in the y direction. Based on these color density data sets, the average value of the color density data in the area e-f at HP1 is represented by Dave[P1] [e-f], and the average value of the color density data in the area e-f at HP2 is represented by Dave[P2] [e-f]. The ratio of the two average values is calculated, and a coefficient K is determined.

$$K=\text{Dave}[P1][e\text{-}f]/\text{Dave}[P2][e\text{-}f] \quad (3)$$

Next, in Step S1404, the determined coefficient K is multiplied by the entire nozzle area of the recording head. In this embodiment, the average value for HP2 is matched with the average value of HP1.

$$Dp1[P2][Y]=K\times\text{Dave}[P2][Y] \quad (4)$$

Through this process, the color density difference between the HP1 and the HP2 can be decreased.

By performing correction by calculating the ratio in this way, color density differences due to, for example, a difference in the dynamic range due to drying or a difference in the luminance signals of the scanner, can be reduced. The influence of causes, such as a dark current of a sensor and drifting of an analog circuit, can reduced by calculating the difference of Expressions 5 and 6 to determine a coefficient K' and adding this to the entire nozzle area of the recording head at the HP2.

$$K'=\text{Dave}[P1][e\text{-}f]-\text{Dave}[P2][e\text{-}f] \quad (5)$$

$$Dp1[P2][Y]=K+D[P2][Y] \quad (6)$$

Here, Y represents the nozzle position of the recording head at the HP2 in the y direction.

The analysis and correction for correcting the repeatability error of color density data of different head positions (HPs) has been described above. In this way, by adding the overlapping area of the color density data at the HP1 and HP2 to the entire area, the influence of light from the MTF of the optical system and scattered light from illumination is also reduced when the edge sections of the test chart is read by the scanner.

Figure 13B:
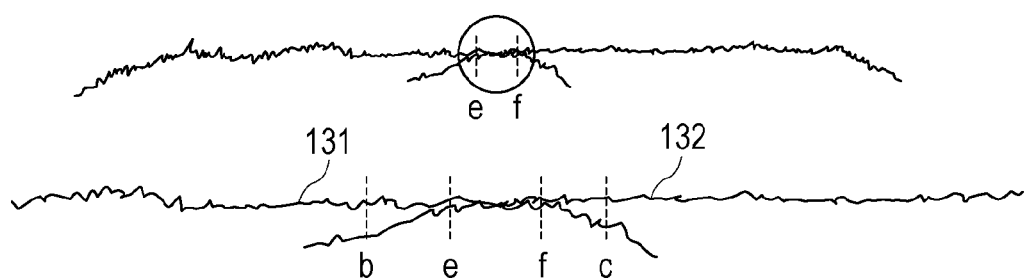

Next, correction performed when the color density data sets in the overlapping area is combined will be described with reference to FIG. 13B. Since the repeatability error is decreased in Step S1404, the average color densities of the nozzles in the overlapping areas at the head positions match. However, a noise component that remains due to causes other than the repeatability error and that occur during recording and analysis at each head position causes a difference depending on the position of the recording head in the y direction. Such causes other than the repeatability error may be nonuniformity in drying and the scanner, in addition to randomly occurring causes. Since the average color densities match as a result of correcting the repeatability error, there is no problem in using an analysis value obtained at any one of the head positions. However, at the border of each head position, when a noise component having low level of correlation with noise generated at each head position is included, the change becomes discontinuous, and a correction error could cause a defective image. Thus, in the overlapping area, at a position b, which is the border of the HP1, the data of the HP1 is weighted, and at a position c, which is the border of the HP2, the data of the HP2 is weighted.

In Step S1406, to reduce the aberration generated in the area b-c, weighted averaging by the ratio corresponding to the position in the y direction is performed on the color density data for the recording head at each head position.

$$Dwa[Y]=\alpha D[P1][Y]+(1-\alpha)Dp1[P2][Y](0\leq\alpha\leq1,\\b\leq Y\leq c) \quad (7)$$

Here, when Y=b, α=1, and when Y=c, α=0.

As described above, the corrected color density data D[Y] is calculated from the position Y in the y direction as indicated below (Step S1407).

$$D[Y]=\begin{cases} D[P1][Y] & (a\leq Y<b) \\ Dwa[Y] & (b\leq Y\leq c) \\ Dp1[P2][Y] & (c<Y\leq d) \end{cases} \quad (8)$$

The above-described processing is carried out on one color-value data set among the uniform input image recorded in Step S904.

Thus, Dn[Y] is determined for all test patterns by carrying out processing for all bands in all test patterns (Step S1408). Then, B[Y] is calculated on the basis of D1[Y], D2[Y], . . . Dn[Y], which are corrected with corresponding patches. In this embodiment, since Dn[Y] is color density data, and B[Y] is luminance data, post-processing of log conversion for converting the color density data to luminance data is performed (Step S1409). Then, the process is ended (Step S1410).

As described above, in this embodiment, correction for reducing repeatability error and correction of decreasing errors, such as unevenness in drying and reading errors of the scanner, that cannot be decreased by repeatability error are performed. By weighting the color density data at the head position when combining the color density data sets corresponding to the area of redundantly used nozzles, a reduction in image quality caused by aberration occurring in the correction result can be suppressed, and appropriate correction can be performed.

As described above, it is desirable to select the size of the recording medium on which the correction test patterns are recorded such that the area b-c, which is an overlapping area, is set as long as possible. The following relationship stands:

$$\Delta/dy = \tan \Theta \qquad (9)$$

where $\Delta$ represent a change in the color density difference, $\tan \Theta$ represent the gradient, and dy represent the length in the y direction in which change occurs. That is, as the more gradual the change, i.e. gradient, becomes, the more visually difficult the detection becomes. Therefore, it is desirable that the change $\Delta$ becomes small or change occurs in a section long in the y direction. Thus, the required length dy can be determined from the relationship between the generated color density difference (change $\Delta$) and $\tan \Theta$ With respect to dy, the longer the overlapping area is, the more effective the relaxation processing by the above-described weighted averaging becomes.

By setting the unit of the position Y to a minimum unit for performing correction in the y direction, the processing data can be reduced. However, the unit of the position Y depends on the cause of change requiring correction. Detection correction of the ejecting volume of each nozzle is performed per nozzle, whereas correction of the characteristic of the heater driving the nozzles is performed per heater. Furthermore, correction of the characteristic of the head chip is performed per head chip, whereas correction of the cooling characteristics of the ink supplying system is performed per ink supply channel. By setting the size to a size that cannot be visibly resolved, an excessive amount of high resolution data is prevented from being processed.

In this embodiment, rolled paper is used. Instead, however, cut paper may be used. In this embodiment, recording is performed by conveying the recording medium, instead of scanning the recording head. However, the present invention is not limited thereto. That is, so long as scanning is performed relatively to the recording head and the recording medium, the recording head may be scanned with respect to the recording medium to perform recording. At this time, the scanning direction of the recording medium is a direction intersecting with the direction of the nozzle array of the recording head.

In this embodiment, the recording head ejects ink of four colors, C, M, Y, and K. However, the recording head is not limited thereto, and a recording head that ejects ink of colors such as light cyan (Lc), light magenta (Lm), light yellow (Ly), and gray (Gy) may be used. Moreover, the recording head 111 has four recording heads 101 to 104, which respectively eject CMYK ink. However, instead, a single recording head that ejects ink of multiple colors may be used.

In this embodiment, the inkjet recording apparatus main body 100 includes the scanner 317. However, instead, a scanner may be provided separately from the recording apparatus, and the recording apparatus may receive the measurement results. The process of generating correction data may be performed by either the inkjet recording apparatus main body 100 or the host PC 300, and parts of the processing may be performed by either one.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
a conveyance unit configured to convey a print medium;
a printing unit configured to print a first test pattern using a print head having a plurality of print elements arranged in a first direction on a part of a print medium conveyed in a second direction intersecting the first direction by the conveyance unit, and print a second test pattern using the print head on another part of the print medium, on which the first pattern has been printed, conveyed in the second direction by the conveyance unit,
wherein in the first direction a width of the widest print medium of print mediums that the conveyance unit conveys is smaller than a width with which the plurality of print elements is arranged in the print head,
and wherein the first test pattern is printed with a first group of print elements, the number of which is smaller than the number of the print elements of the print head and which are continuously aligned from one edge of the print head, the second test pattern is printed with a second group of print elements, the number of which is smaller than the number of the print elements of the print head, and at least some of the print elements in the second group are not included in the first group;
a moving unit configured to move the print head in the first direction such that a position of the print head with respect to the print medium when the first test pattern is printed is different from a position of the print head with respect to the print medium when the second test pattern is printed,
wherein the moving unit moves the print head in the first direction and the printing unit prints the second test pattern such that a printed region of the first pattern and a printed region of the second pattern overlap in the first direction;
a measurement unit having a measuring area in the first direction and configured to measure the first test pattern and the second test pattern on the print medium by relative movement between the print medium and the measurement unit, in the second direction; and
a generation unit configured to generate print data for printing an image with the first and second groups based on measurement results of the first test pattern and the second test pattern measured by the measurement unit.

2. The image processing apparatus according to claim 1, wherein a length of the print medium in the first direction is shorter than a length of the print head in the first direction in which the plurality of print elements are arranged.

3. The image processing apparatus according to claim 1, wherein a maximum length of an image printable by the print head in the first direction is equal to or longer than a length of the first test pattern and a length of the second test pattern in the first direction.

4. The image processing apparatus according to claim 1, wherein a maximum length of an image printable by the print head in the first direction is equal to or shorter than a sum of a length of the first test pattern and a length of the second test pattern in the first direction.

5. The image processing apparatus according to claim 1, wherein a length of the recoding medium conveyable by the conveyance unit in the first direction is shorter than a width with which the plurality of print elements is arranged in the print head in the first direction.

6. The image processing apparatus according to claim 1, further comprising a drying unit configured to dry the first test pattern and the second test pattern, and a measurement unit measures the first test pattern and the second test pattern dried by the drying unit.

7. The image processing apparatus according to claim 1, wherein the moving unit moves the print head in the first direction and printing unit prints the second test pattern such that a printed region of the first pattern and a printed region of the second pattern substantially coincide with each other in the first direction.

8. The image processing apparatus according to claim 1, wherein the plurality of print elements is used for ejecting ink.

9. The image processing apparatus according to claim 1, wherein the print unit prints each of the first and second test pattern with patterns for detecting positions of the print elements of the first group used for printing the first test pattern and print elements of the second group used for printing the second test pattern.

10. The image processing apparatus according to claim 1, wherein the plurality of print elements is used for ejecting ink.

11. An image processing method comprising:
conveying a print medium by a conveyance unit;
printing a first test pattern using a print head having a plurality of print elements arranged in a first direction on a part of a print medium conveyed in a second direction intersecting the first direction by the conveyance unit;
moving the print head in the first direction to change a position of the print head with respect to the print medium, from the position of the print head with respect to the print medium when the first test pattern is printed;
printing a second test pattern using the moved print head on another part of the print medium, on which the first pattern has been printed, conveyed in the second direction by the conveyance unit,
wherein in the first direction a width of the widest print medium of print mediums that the conveyance unit can convey is shorter than a width with which the plurality of print elements is arranged in the print head,
wherein the first test pattern is printed with a first group of print elements, the number of which is smaller than the number of the print elements of the print head and which are continuously aligned from one edge of the print head, the second test pattern is printed with a second group of print elements, the number of which is smaller than the number of the print elements of the print head, and at least some of the print elements in the second group are not included in the first group, and
wherein a printed region of the first pattern and a printed region of the second pattern overlap in the first direction;
measuring the first test pattern and the second test pattern on the print medium by relative movement in the second direction between the print medium and a measurement unit having a measuring area in the first direction;
generating print data for printing an image with the first and second groups based on measurement results of the first test pattern and the second test pattern.

12. An image processing apparatus comprising:
a conveyance unit configured to convey a print medium;
a printing unit configured to print a first test pattern using a print head having a plurality of print elements arranged in a first direction on a part of a print medium conveyed in a second direction intersecting the first direction by the conveyance unit, and print a second test pattern using the print head on another part of the print medium, on which the first pattern has been printed, conveyed in the second direction by the conveyance unit,
wherein in the first direction a width of the widest print medium of print mediums that the conveyance unit conveys is smaller than a width with which the plurality of print elements is arranged in the print head, and
wherein the first test pattern is printed with a first group of print elements, the number of which is smaller than the number of the print elements of the print head and which are continuously aligned from one edge of the print head, the second test pattern is printed with a second group of print elements, the number of which is smaller than the number of the print elements of the print head, and at least some of the print elements in the second group are not included in the first group;
a moving unit configured to move the print head in the first direction such that a position of the print head with respect to the print medium when the first test pattern is printed is different from a position of the print head with respect to the print medium when the second test pattern is printed,
wherein the moving unit moves the print head in the first direction and the printing unit prints the second test pattern such that a printed region of the first pattern and a printed region of the second pattern overlap in the first direction; a drying unit configured to dry the first test pattern and the second test pattern by drying treatment to the print medium;
a measurement unit having a measuring area in the first direction and configured to measure the first test pattern and the second test pattern dried by the drying unit on the print medium by relative movement between the print medium and the measurement unit, in the second direction; and
a generation unit configured to generate print data for printing an image with the first and second groups based on measurement results of the first test pattern and the second test pattern measured by the measurement unit.

13. The image processing apparatus according to claim 12, wherein a length of the print medium in the first direction is shorter than a length of the print head in the first direction in which the plurality of print elements are arranged.

14. The image processing apparatus according to claim 12, wherein a maximum length of an image printable by the print head in the first direction is equal to or longer than a length of the first test pattern and a length of the second test pattern in the first direction.

15. The image processing apparatus according to claim 12, wherein a maximum length of an image printable by the print head in the first direction is equal to or shorter than a sum of a length of the first test pattern and a length of the second test pattern in the first direction.

16. The image processing apparatus according to claim 12, wherein a length of the recoding medium conveyable by the conveyance unit in the first direction is shorter than a width with which the plurality of print elements is arranged in the print head in the first direction.

* * * * *